United States Patent
Liu et al.

(10) Patent No.: US 11,895,364 B2
(45) Date of Patent: Feb. 6, 2024

(54) BLUETOOTH CONNECTION METHOD AND TELEVISION

(71) Applicant: Hisense Visual Technology Co., Ltd., Qingdao (CN)

(72) Inventors: Ruikai Liu, Qingdao (CN); Yunfei Ma, Qingdao (CN)

(73) Assignee: HISENSE VISUAL TECHNOLOGY CO., LTD., Qingdao (CN)

( * ) Notice: Subject to any disclaimer, the term of this patent is extended or adjusted under 35 U.S.C. 154(b) by 190 days.

(21) Appl. No.: 17/466,194

(22) Filed: Sep. 3, 2021

(65) Prior Publication Data

US 2021/0400339 A1   Dec. 23, 2021

Related U.S. Application Data

(63) Continuation of application No. PCT/CN2020/083463, filed on Apr. 7, 2020.

(30) Foreign Application Priority Data

Jul. 22, 2019 (CN) .......................... 201910662736.8

(51) Int. Cl.
*H04N 21/443* (2011.01)
*H04W 4/80* (2018.01)
(Continued)

(52) U.S. Cl.
CPC ....... *H04N 21/4436* (2013.01); *G06F 1/3209* (2013.01); *G06F 1/3278* (2013.01);
(Continued)

(58) Field of Classification Search
CPC ......... H04N 21/4436; H04N 21/42221; H04N 21/43637; H04N 21/44227;
(Continued)

(56) References Cited

U.S. PATENT DOCUMENTS 9,395,792 B1 *   7/2016 Kahn ..................... H04W 4/80
2016/0043775 A1   2/2016 Ravani et al.
(Continued)

FOREIGN PATENT DOCUMENTS

CN      105208198 A      12/2015
CN      108024239 A       5/2018
(Continued)

*Primary Examiner* — John W Miller
*Assistant Examiner* — Sean N. Haiem
(74) *Attorney, Agent, or Firm* — Workman Nydegger

(57) ABSTRACT

Disclosed are a Bluetooth connection method and a television. The method may comprise: in response to a connection command for establishing a Bluetooth connection with a target Bluetooth device, determining a screen state of a display apparatus, wherein the screen state comprises a screen-on state or a screen-off state; if the screen state of the display apparatus is the screen-on state, establishing a Bluetooth connection with the target Bluetooth device; and if the screen state of the display apparatus is a screen-off state, forbidding the establishment of a Bluetooth connection with the target Bluetooth device. In the disclosure, a display apparatus establishes a connection with a Bluetooth device only when the screen state of the display apparatus is a screen-on state, thereby avoiding the situation where the display apparatus establishes a connection with the Bluetooth device when the display apparatus is in screen-off state.

18 Claims, 6 Drawing Sheets

(51) Int. Cl.
  *G06F 1/3209* (2019.01)
  *G06F 1/3234* (2019.01)
  *H04N 21/422* (2011.01)
  *H04N 21/4363* (2011.01)
(52) U.S. Cl.
  CPC . *H04N 21/42221* (2013.01); *H04N 21/43637* (2013.01); *H04W 4/80* (2018.02)
(58) Field of Classification Search
  CPC ............ H04N 21/4126; H04N 21/4424; G06F 1/3209; G06F 1/3278; G06F 1/3203; H04W 4/80; H04W 52/0225; H04M 1/72412; H04M 1/72415; H04M 2250/02; Y02D 10/00; Y02D 30/70
  USPC .......................................................... 348/730
  See application file for complete search history.

(56) References Cited

U.S. PATENT DOCUMENTS

| | | | |
|---|---|---|---|
| 2016/0112991 A1* | 4/2016 | Chen | H04B 1/525 455/553.1 |
| 2016/0218683 A1* | 7/2016 | Rada | H03F 3/19 |
| 2017/0064073 A1* | 3/2017 | Spencer | H04M 1/724631 |
| 2018/0295188 A1* | 10/2018 | Bahners | H04L 41/22 |
| 2019/0281547 A1* | 9/2019 | Yoon | H04N 21/42684 |
| 2019/0355365 A1* | 11/2019 | Kim | G06F 1/3209 |

FOREIGN PATENT DOCUMENTS

| | | |
|---|---|---|
| CN | 108737869 A | 11/2018 |
| CN | 109195173 A | 1/2019 |
| CN | 110381489 A | 10/2019 |

* cited by examiner

BLUETOOTH CONNECTION METHOD AND TELEVISION

CROSS-REFERENCE TO RELATED APPLICATIONS

The application is a continuation application of International Application No. PCT/CN2020/083463 filed Apr. 7, 2020, which claims the benefit and priority of Chinese Patent Application No. 201910662736.8 filed Jul. 22, 2019. The entire disclosures of the above applications are incorporated herein by reference.

FIELD

The present disclosure relates to Bluetooth communication technology, and in particular to a Bluetooth connection method and a television.

BACKGROUND

This section provides background information related to the present disclosure which is not necessarily prior art.

With the development of technology, the Bluetooth module and the Wireless Fidelity (WIFI) module in a television can be integrated into one module. The screen always goes to sleep while the television entering into standby mode.

In the related art, in a case where the television receives a command to turn off the WIFI wake-up function, there is no need to supply power to the WIFI module in the standby mode. While in a case where the television receives a command to turn on the WIFI wake-up function, power supply is required for the WIFI module in the standby mode to allow the WIFI module to be in activated state. Since the Bluetooth module and the WIFI module share the same power supply circuit, the Bluetooth module is always in the same state as the WIFI module. As such, in response to a wake-up signal from a mobile phone through the WIFI module, the television in the standby mode can establish a connection with a Bluetooth device through the Bluetooth module.

SUMMARY

This section provides a general summary of the disclosure, and is not a comprehensive disclosure of its full scope or all of its features.

Some embodiments of the disclosure provide a Bluetooth connection method and a television, which can at least solve the problem of relatively large power consumption of the television in the related art.

According to a first aspect, a Bluetooth connection method for a display apparatus is provided, including:
  determining a screen state of the display apparatus in response to a connection command for establishing a Bluetooth connection with a target Bluetooth device, wherein the screen state includes on and off states; in response to the screen being on, establishing a Bluetooth connection with the target Bluetooth device; and in response to the screen being off, preventing a Bluetooth connection with the target Bluetooth device.

According to a second aspect, a Bluetooth connection method for a display apparatus includes:
  receiving a wake-up command for causing a Bluetooth module of the display apparatus powered-on; receiving a connection command for establishing a Bluetooth connection with a target Bluetooth device; establishing a Bluetooth connection with the target Bluetooth device via the Bluetooth module while the screen is on; and preventing the Bluetooth connection with the target Bluetooth device while the screen is off.

According to a third aspect, a Bluetooth connection method for a display apparatus includes: receiving a wake-up command for causing an operating system of the display apparatus into running state, a Bluetooth module of the display apparatus into activated state and the screen maintain off; receiving a connection command for establishing a Bluetooth connection with a target Bluetooth device, and receiving a command for turning on the screen sent from a mobile terminal, wherein the command for turning on the screen is used to cause the screen into on state; verifying the mobile terminal that sends the command for turning on the screen; establishing a Bluetooth connection with the target Bluetooth device via the Bluetooth module in response to the verification being successful; and preventing a Bluetooth connection with the target Bluetooth device in response to the verification being not successful.

According to a fourth aspect, a Bluetooth connection device for a display apparatus is provided, which includes:
  a determining module configured to: determine a screen state of the display apparatus in response to a connection command for establishing a Bluetooth connection with a target Bluetooth device, wherein the screen state includes on and off states;
  an establishment module configured to: in response to the screen being on, establish a Bluetooth connection with the target Bluetooth device;
  a prevention module configured to: in response to the screen being off, prevent a Bluetooth connection with the target Bluetooth device.

According to a fifth aspect, a display apparatus is provided, including: a WiFi module, a Bluetooth module and a processor, wherein the WiFi module and the Bluetooth module share the same power supply circuit; and the processor is configured to: determine a screen state of the display apparatus in response to a connection command for establishing a Bluetooth connection with a target Bluetooth device, wherein the screen state includes on and off states; in response to the screen being on, establish a Bluetooth connection with the target Bluetooth device via the Bluetooth module; and in response to the screen being off, prevent Bluetooth connection with the target Bluetooth device.

According to a sixth aspect, a television is provided, including: a WiFi module, a Bluetooth module and a processor, where the WiFi module and the Bluetooth module share the same power supply circuit; and the processor is configured to: determine a screen state of the display apparatus in response to a connection command for establishing a Bluetooth connection with a target Bluetooth device, wherein the screen state includes on and off states; in response to the screen being on, establish a Bluetooth connection with the target Bluetooth device via the Bluetooth module; and in response to the screen being off, prevent Bluetooth connection with the target Bluetooth device.

According to a seventh aspect, a television is provided, including: a WiFi module; a Bluetooth module; a power supply circuit, where the WiFi module and the Bluetooth module share the power supply circuit; and a processor configured to: receive a wake-up command that is used to cause the Bluetooth module into an activated state; receive a connection command for establishing a Bluetooth connection with a target Bluetooth device; establish a Bluetooth connection with the target Bluetooth device via the Bluetooth module while a screen state of the television is on; and prevent the Bluetooth connection with the target Bluetooth device while the screen is off.

According to an eighth aspect, a television is provided, including: a screen; a WiFi module; a Bluetooth module; a power supply circuit, where the WiFi module and the Bluetooth module share the power supply circuit; a processor configured to: receive a wake-up command that is used to cause an operating system of the television into a running state, the Bluetooth module into an activated state and the screen to maintain off; receive a connection command for establishing a Bluetooth connection with a target Bluetooth device, and receive a command for turning on the screen sent from a mobile terminal, where the command for turning on the screen is used to turn on the screen; verify the mobile terminal that sends the command for turning on the screen; establish a Bluetooth connection with the target Bluetooth device through the Bluetooth module in response to the verification being successful; and prevent the Bluetooth connection with the target Bluetooth device in response to the verification being not successful.

According to a ninth aspect, a non-transitory computer readable storage medium is provided, wherein the non-transitory computer readable storage medium stores instructions thereon, and the non-transitory computer readable storage medium causes a computer to perform the Bluetooth connection method as described in the above aspects when running on the computer.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all implementations, and are not intended to limit the scope of the present disclosure.

Corresponding reference numerals indicate corresponding parts or features throughout the several views of the drawings.

DETAILED DESCRIPTION

Example embodiments will now be described more fully with reference to the accompanying drawings.

Figure 1:
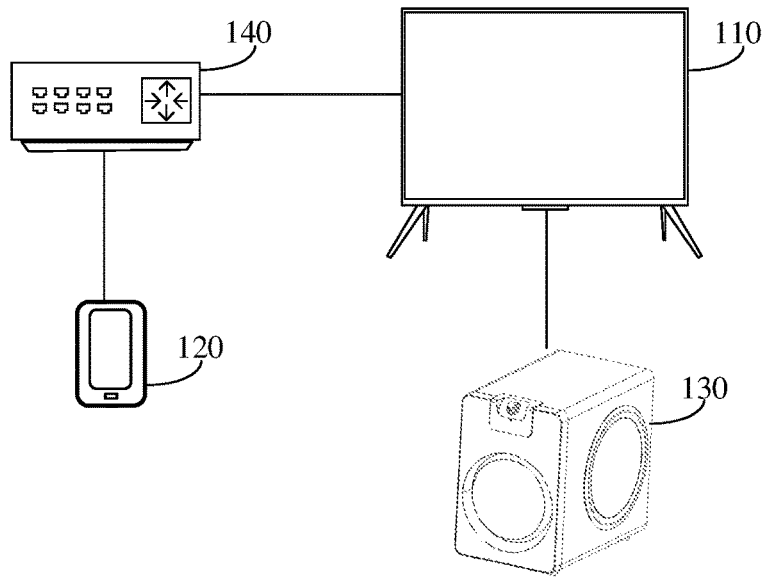
FIG. 1 illustrates a schematic diagram of an implementation environment of Bluetooth connection method according to some embodiments of the disclosure.

FIG. 1 illustrates a schematic diagram of an implementation environment of the Bluetooth connection method according to some embodiments of the disclosure. As shown in FIG. 1, the implementation environment may include: a display apparatus 110, a sending device 120, a Bluetooth device 130, and a wireless access device 140. The display apparatus 110 may be a device with display function, such as a television, a personal computer, a notebook computer, a tablet computer or a mobile phone, etc., and the operating system installed in the display apparatus 110 may be Android operating system. The sending device 120 may be a device such as a mobile phone, a personal computer, a notebook computer, or a tablet computer, etc. The Bluetooth device 130 may be a device with Bluetooth function, such as a speaker (or a soundbar), a personal computer, a notebook computer, a tablet computer, or a mobile phone, etc. In some embodiments, the Bluetooth device 130 may support the Bluetooth advanced audio distribution profile (A2DP). The wireless access device 140 may be a wireless router or a wired router. The display apparatus 110 and the sending device 120 may communicate through the wireless access device 140. While the display apparatus 110 and the Bluetooth device 130 may communicate through Bluetooth.

In a case where the display apparatus 110 is a television and the Bluetooth device 130 is a speaker. In the related art, since the Bluetooth module and the WIFI module in the television share the same power supply, the television in the standby mode can turn on the Bluetooth module and control the Bluetooth module to establish a connection with the Bluetooth device after receiving a wake-up command sent from the mobile phone. When the Bluetooth device establishes the connection with the Bluetooth module, the Bluetooth device will output a voice prompt message "connection succeeds". After that, the television can verify the mobile phone. In a case that verification is not successful, the Bluetooth module can be controlled to disconnect from the Bluetooth device and the Bluetooth module is turned off. When the Bluetooth device is disconnected from the Bluetooth module, the Bluetooth device will output a voice prompt message "connection fails". As such, during this wake-up process, in the case that the mobile phone is not authorized, the television in the standby mode will disconnect from the Bluetooth device, which increases power consumption of the television. Also, since the television is in the standby mode, the Bluetooth device will continuously issue voice prompts, resulting in poor user experience.

Figure 2:
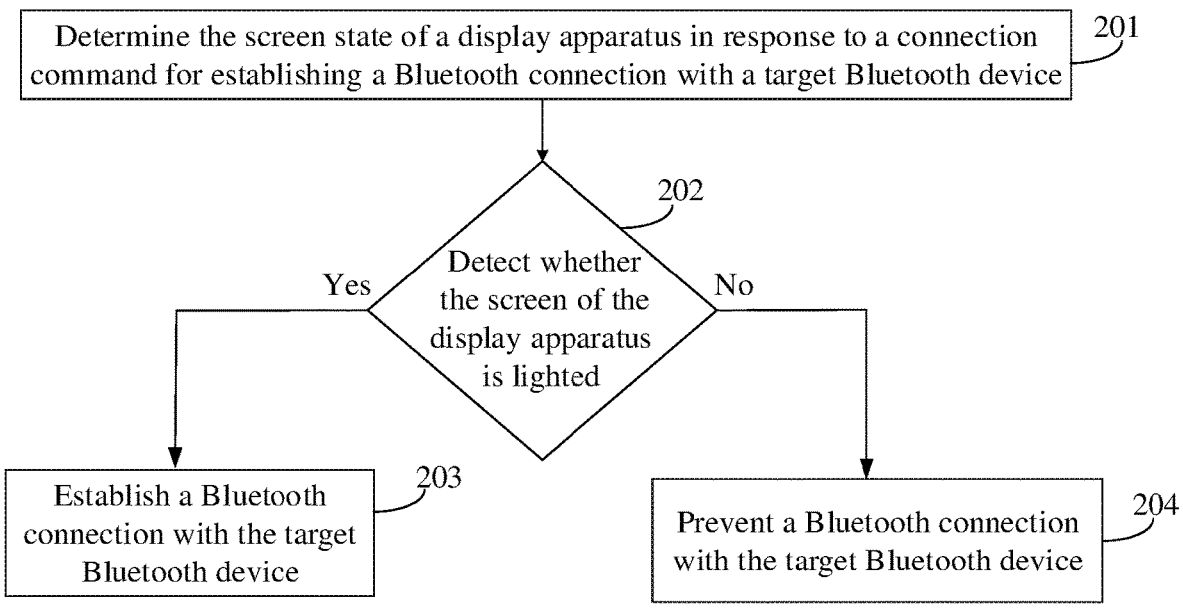
FIG. 2 illustrates a flowchart of a Bluetooth connection method according to some embodiments of the disclosure.

FIG. 2 shows a flowchart of a Bluetooth connection method according to some embodiments of the disclosure. The Bluetooth connection method may be applied to the display apparatus 110 shown in FIG. 1. As shown in FIG. 2, the method can include the following steps.

Step 201: determine the screen state of a display apparatus in response to a connection command for establishing a Bluetooth connection with a target Bluetooth device.

Here, the screen state of the display apparatus may include on and off states. If the display apparatus is powered on, the screen is lighted. If the display apparatus is in the standby mode, the screen is not lighted or off.

In some embodiments, the connection command may be sent from the target Bluetooth device to the display apparatus, or may be a command generated by the display apparatus through the Bluetooth module. Also, the target Bluetooth device may be one Bluetooth device or a plurality of Bluetooth devices.

Step 202: detect whether the screen of the display apparatus is lighted.

The display apparatus can detect whether the screen is on, and the flow goes to step 203 if it is determined that the screen is on, while the flow goes to step 204 if it is determined that screen is off.

Step 203: establish a Bluetooth connection with the target Bluetooth device.

When it is determined that the screen is turned on, the display apparatus is determined as being powered on, and thus a Bluetooth connection with the target Bluetooth device via the Bluetooth module can be established.

Step 204: prevent a Bluetooth connection with the target Bluetooth device.

When it is determined that the screen is off, the display apparatus is determined as being in the standby mode, and thus the Bluetooth connection between the Bluetooth module and the target Bluetooth device is prevented.

As such, in some embodiments of the disclosure, a Bluetooth connection method includes determining the screen state of a display apparatus in response to a connection command for establishing a Bluetooth connection with a target Bluetooth device, establishing a connection with the target Bluetooth device in response to the screen being on, and preventing such connection in response to the screen being off. Since the display apparatus establishes the connection with the Bluetooth device only when it is determined that the screen is on, a connection in a case that the screen is off is avoided, and also first connecting and soon disconnecting with the Bluetooth device in the case that the verification of the sending device fails can be avoided, thereby reducing the power consumption of the display apparatus compared with the related art.

Figure 3:
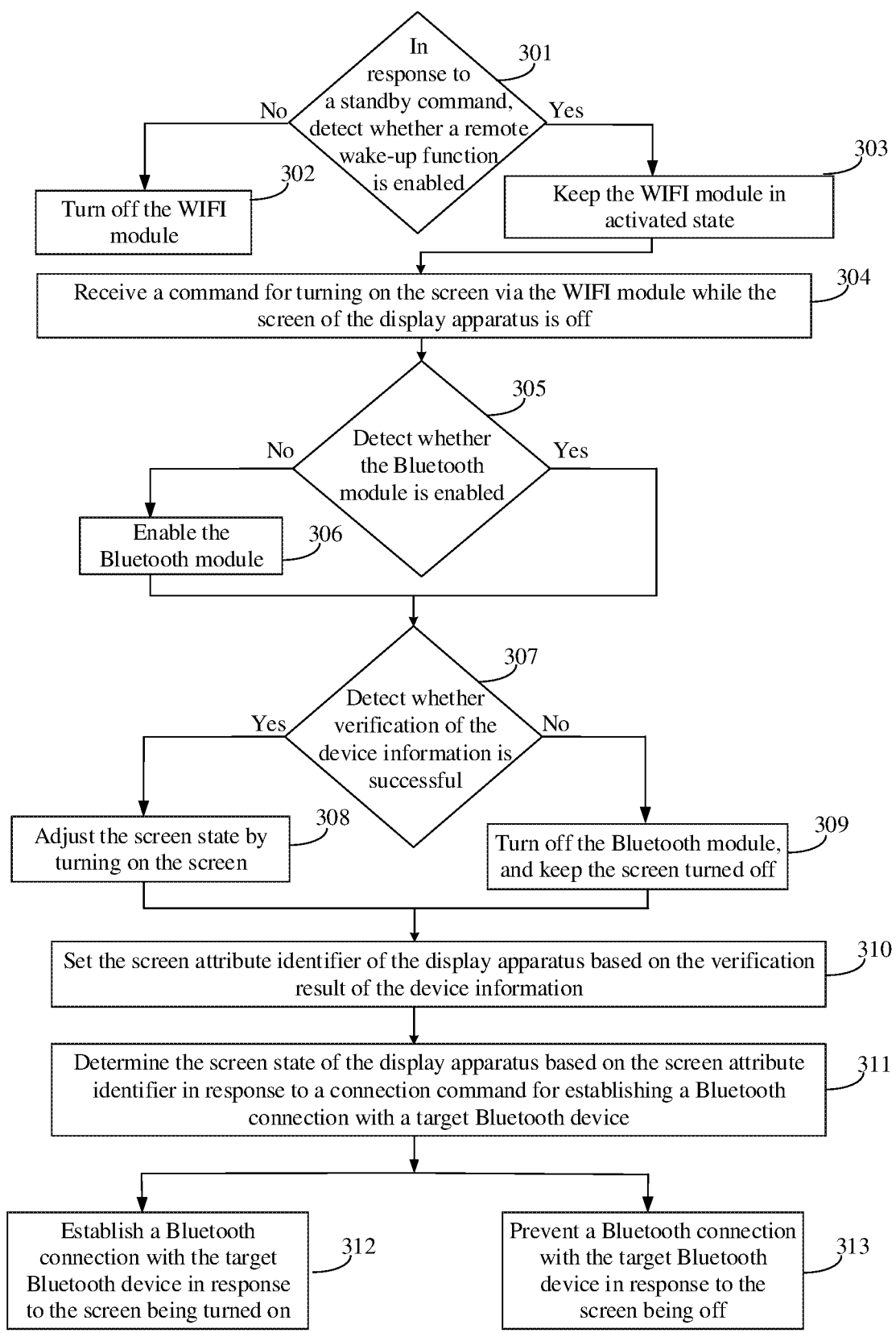
FIG. 3 illustrates a flowchart of another Bluetooth connection method according to some embodiments of the disclosure.

FIG. 3 shows a flowchart of another Bluetooth connection method according to some embodiments of the disclosure. During the execution of the method, the sequence of some steps can be reordered as long as there is no processing conflict. The Bluetooth connection method may be applied to the display apparatus 110 shown in FIG. 1, and the method may include the following steps.

Step 301: in response to a standby command, detect whether a remote wake-up function is enabled.

Figure 4:
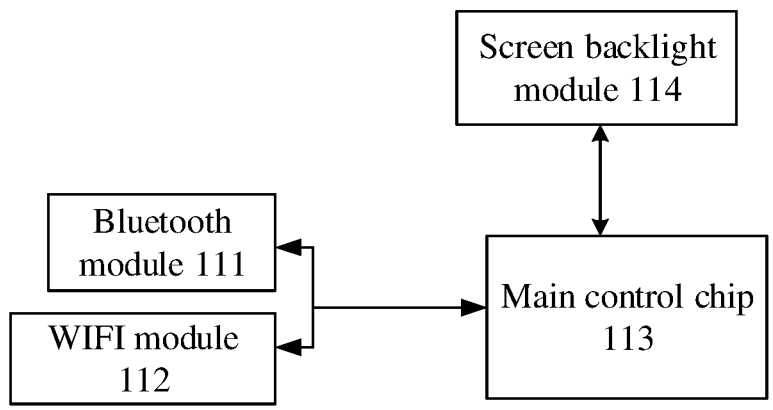
FIG. 4 illustrates a schematic diagram of the partial structure of a display apparatus according to some embodiments of the disclosure.

In some embodiments of the disclosure, as shown in FIG. 4, the display apparatus 110 may include a Bluetooth module 111 and a WIFI module 112 that share the same power supply, that is, the Bluetooth module 111 and the WIFI module 112 may be integrated on a same chip. When the display apparatus is powered on, the WIFI module and the Bluetooth module are both in activated state.

In some embodiments, the Bluetooth module 111 and the WIFI module 112 sharing the same power supply means that the Bluetooth module 111 and the WIFI module 112 are always powered on and off at the same time.

In some embodiments, the power supply circuit may be a part of the overall circuit of the display apparatus.

In some embodiments, the display apparatus may have a standby button. In response to detecting a click operation on the standby button, the display apparatus may generate a standby command, and enter the standby mode in response to the standby command while detecting whether the display apparatus enables the remote wake-up function. The flow goes to step 302 if it is determined that the remote wake-up function is not enabled, or goes to step 303 if it is determined that the remote wake-up function is enabled.

In some embodiments of the disclosure, the display interface of the display apparatus has a remote wake-up button, and the display apparatus can enable the remote wake-up function upon detecting a click operation on the remote wake-up button based on a user's input. In order to enable the sending device to wake up the display apparatus in the standby mode remotely, the user needs to enable the remote wake-up function before the display apparatus enters the standby mode.

Step 302: turn off the WIFI module.

In some embodiments, if the display apparatus determines that the remote wake-up function is not enabled, the WIFI module can be turned off, so that the WIFI is in the off state after the display apparatus enters the standby mode.

Meanwhile, the power supply is cut off. The WIFI module will not respond to the wake-up command from the sending device either. There is a need for the user to start the power supply of the display apparatus via a physical key, then the power supply circuit provides power supply to the Bluetooth module 111 and the WIFI module 112, and then the Bluetooth module 111 and the WIFI module 112 start to enter the working state to allow the Bluetooth or WIFI communication.

Step 303: keep the WIFI module in activated state.

In some embodiments, if it is determined that the remote wake-up function is enabled, the WIFI module can be kept in the activated state, so that the sending device can wake up the display apparatus in the standby mode remotely. Also, the power supply of the WIFI module needs to be maintained. Since the WIFI module and the Bluetooth module share the same power supply circuit, the Bluetooth module can be controlled to be in the powered-on but inactivated state while the display apparatus enters into the standby mode.

In some embodiments, the Bluetooth module can also be maintained in the activated state.

In some embodiments, the display apparatus may further include a Power Management (PM) module and a Random Access Memory (RAM). In the standby mode, in addition to the RAM, PM module and WIFI module, Central Processing Unit (CPU) in the display apparatus will enter a suspend state, i.e., non-working state. The applications running in the display apparatus before entering the standby mode and the modules in the display apparatus are also in the non-working state. The operating data of the operating system of the display apparatus before entering the standby mode may be stored in the RAM.

In some embodiments of the disclosure, while the display apparatus enters the standby mode, the sending device sends a wake-up command to the display apparatus automatically after being in the same local area network as the display apparatus. For example, the sending device can send the wake-up command to the display apparatus periodically after being in the same local area network as the display apparatus.

At least some functions of the WIFI module are always in activated state. In response to receiving a wake-up command sent from the sending device, the WIFI module of the display apparatus can adjust the electric level in its GPIO port. In response to detecting a change in electric level of the GPIO port of the WIFI module, the PM module (the power supply management module of the display apparatus) can wake up the CPU, start the Bluetooth module, restore the kernel space and user space, and resume the operating data of the operating system from the RAM quickly, to allow a fast booting in response to receiving a subsequent command for turning on the screen. And, all the applications running on the display apparatus before entering the standby mode and all the modules in the non-working state will be restarted. In some embodiments, while the display apparatus is in the power-on state, the operating system thereof runs in the kernel space, and each application runs in the user space.

But, since the wake-up command does not include an instruction for turning on the screen, the display apparatus can start the Bluetooth module in response to the wake-up command, but will not change the screen state thereof, that is, the screen maintains off.

In some scenarios, a mobile phone as the sending device sends a wake-up command to the television in response to being in the same local area network as the television. For example, when the user takes the mobile phone home, the mobile phone will send a wake-up command to the television in response to connecting to the local area network to make the television in the hot standby mode and ready to respond to the power-on command from the user at any moment. As such, the television can turn on the screen quickly to enter the work state upon receiving a command for turning on the screen from the mobile phone.

Step 304: receive a command for turning on the screen via the WIFI module while the screen of the display apparatus is off.

While the screen is off, the display apparatus can receive the command for turning on the screen sent from the sending device via the WIFI module of the display apparatus, here the command for turning on the screen may be a multicast Domain Name System (mDNS) message that includes device information of the sending device and indication information for turning on the screen. In response to receiving the mDNS message via the WIFI module, the display apparatus can forward the mDNS message to the multicast Domain Name System Daemon (mDNSD), to obtain the device information of the sending device and the indication information for turning on the screen by parsing the mDNS message through the mDNSD.

Here, the WIFI module is in activated state while the display apparatus is in standby mode, thus the display apparatus can receive the command for turning on the screen sent from the sending device via the WIFI module.

In some embodiments of the disclosure, the command for turning on the screen may be a command generated by the sending device (for example, a mobile terminal) in response to the user's trigger operation. In some embodiments, the display interface of the sending device may have a wake-up icon, and the sending device may generate a command for turning on the screen carrying device information and indication information for turning on the screen of the display apparatus in response to detecting a click operation on the wake-up icon on the sending device, and send the command for turning on the screen to the display apparatus via the wireless access device. While the display apparatus is in the standby mode, it can receive the command for turning on the screen sent from the wireless access device via the WIFI module of the display apparatus which is in activated state. Exemplarily, the sending device may be a mobile phone, and the wake-up icon may be a cast button in an application installed on the mobile phone.

Step 305: detect whether the Bluetooth module is enabled.

In response to receiving the command for turning on the screen via the WIFI module of the display apparatus, the processor can detect whether the Bluetooth module is enabled. If the display apparatus determines that the Bluetooth module is not enabled, the display apparatus can perform the step 306. If it is determined that the Bluetooth module has been enabled, the step 307 may be performed.

In some embodiments of the disclosure, before the command for turning on the screen is received via the WIFI module of the display apparatus in the standby mode, in response to a wake-up command received via the WIFI module, the processor may start the Bluetooth process and thus start the Bluetooth module in response to the wake-up command. Therefore, if the display apparatus detects that the Bluetooth module is enabled, the processor may directly perform the step 307.

Here, the wake-up command may be an mDNS message including device information of the sending device. Further, the wake-up command is a command that the sending device automatically sends to the display apparatus in response to being in the same local area network as the display apparatus. For example, the sending device can send the wake-up command to the display apparatus periodically while being in the same local area network as the display apparatus.

In some embodiments, the processor can adjust the electric level of the General Purpose Input/Output (GPIO) port of the WIFI module in response to receiving a wake-up command sent from the sending device via the WIFI module. And in response to detecting a change in electric level of the GPIO port of the WIFI module, the PM module can wake up CPU of the display apparatus, start the Bluetooth module, restore the kernel space and user space, and resume the operating data of the operating system from the RAM quickly, to allow a fast booting. Further, all the applications running on the display apparatus before entering the standby mode and all the modules in the non-working state will be restarted. In the process of starting the Bluetooth module, the display apparatus will re-initialize the Bluetooth protocol stack in the Bluetooth module and all upper profiles (the wireless interface specification for data communication in the Bluetooth module). In some embodiments, while the display apparatus is in the power-on state, the operating system thereof runs in the kernel space, and application runs in the user space.

In some embodiments, since the wake-up command does not carry indication information for turning on the screen, the processor can start the Bluetooth module in response to the wake-up command, but will not adjust the screen state thereof, that is, the screen maintains off.

In some embodiments, the command for turning on the screen in the step 304 may be a command received while the processor is in the standby mode before receiving the wake-up command, or may be a command received before or after the processor enables the Bluetooth module in response to the wake-up command.

Step 306: enable the Bluetooth module.

If it is determined that the Bluetooth module is not enabled, the processor may control the Bluetooth module to be enabled, and then the flow goes to step 307.

In some embodiments, the process of enabling the Bluetooth module in step 306 can refer to the process in which the display apparatus enables the Bluetooth module in response to the wake-up command in step 305, and will omit here.

Step 307: detect whether verification of the device information is successful.

If it is determined that the Bluetooth module is enabled, the processor can verify the device information carried in the command for turning on the screen. If the verification of the device information is successful, the flow goes to the step 308. Or, If the verification of the device information fails, the flow goes to step 309.

In some embodiments of the disclosure, while the display apparatus is in the power-on state, the sending device can discover the display apparatus through the Simple Service Discovery Protocol (SSDP), and send an mDNS message to the display apparatus via the wireless access device. The mDNS message carries the device information of the sending device. In response to receiving the mDNS message through the WIFI module, the display apparatus can establish a connection with the sending device and store the device information of the sending device. As such, for the process of verifying the device information of the sending device, the processor can obtain the device information carried in the command for turning on the screen. If the device information matches with the device information pre-stored in the display apparatus, it is determined that the verification of the device information of the sending device is successful. If the device information does not match with the device information pre-stored in the display apparatus, it is determined that the verification of the device information of the sending device is not successful.

Exemplarily, in an example case that three pieces of device information are pre-stored in the television, e.g., 01:10:20:07:00:0A, 00:00:20:08:0C:5A and 00:10:10:05:0B:0A. If the device information of the mobile phone obtained by the television by parsing the mDNS message is 00:00:20:08:0C:5A, the processor may determine that the verification of the device information is successful because the device information of 00:00:20:08:0C:5A among the three pieces of device information pre-stored in the television matches with the device information of the mobile phone, and then the flow goes to step 308. Otherwise, the flow goes to step 309.

Step 308: adjust the screen state by turning on the screen.

If the verification of the device information is successful, it is determined that the sending device has the authority to control the display apparatus remotely, and the processor can control the screen to be turned on in response to the command for turning on the screen.

Step 309: turn off the Bluetooth module, and keep the screen off.

If the verification of the device information is not successful, the display apparatus can determine that the sending device has not established a connection with the display apparatus before the display apparatus enters the standby mode, so the sending device does not have the authority to control the display apparatus remotely. As such, the processor can control the Bluetooth module to be turned off and keep the screen off, that is, the display apparatus continues to remain in the standby mode.

In some embodiments, when turning off the Bluetooth module, the display apparatus also needs to close the kernel space and user space enabled in step 305 or step 306, the applications in the working state and various modules in the working state in the display apparatus, and store the operating data of the operating system before entering the standby mode in the RAM again; and the CPU enters into suspend state again, until the wake-up command is received again.

Step 310: set the screen attribute identifier of the display apparatus based on the verification result of the device information.

The screen attribute identifier may be used to indicate the screen state of the display apparatus, i.e., the screen is on or off. Exemplarily, the screen attribute identifier may be sys.screen.state.

In some embodiments, the processor may set the screen attribute identifier of the display apparatus as a first identifier if the verification of the device information is successful, here the first identifier is used to indicate that the screen is turned on. If the verification of the device information is not successful, the screen attribute identifier of the display apparatus can be set as a second identifier, here the second identifier is used to indicate that the screen is turned off. In some embodiments, the first identifier may be expressed as "true", and the second identifier may be expressed as "false".

Exemplarily, in the case where the verification of the device information is successful, the television can set its screen attribute identifier (sys.screen.state) as "true". In the case where the verification of the device information is not successful, the television can set its screen attribute identifier (sys.screen.state) as "false".

Step 311: determine the screen state of the display apparatus based on the screen attribute identifier, in response to a connection command for establishing a Bluetooth connection with a target Bluetooth device.

In some embodiments, the connection command may be a command sent from the target Bluetooth device to the display apparatus, or may be a command generated by the display apparatus via the Bluetooth module. The target Bluetooth device may be one or more Bluetooth devices.

In some embodiments, the processor may receive a connection command sent from the target Bluetooth device.

With the upgrade of Bluetooth devices, the device information of the display apparatus can be stored in the Bluetooth device, so the target Bluetooth device can initiate a connection request to the display apparatus if the display apparatus is powered on. Correspondingly, the processor can receive the connection request sent from the target Bluetooth device via the Bluetooth module.

In some embodiments, the processor may determine a target Bluetooth device with which a Bluetooth connection has been established through the Bluetooth module before entering the standby mode, and generate a connection command for establishing a Bluetooth connection with the target Bluetooth device.

In some embodiments, the processor may determine a recent Bluetooth device connected before entering the standby mode as the target Bluetooth device, or the processor may determine a plurality of Bluetooth devices connected within a specified period of time before entering the standby mode as the target Bluetooth devices.

Exemplarily, after enabling the Bluetooth module, the display apparatus can control the Bluetooth module to load a configuration file, which stores the device information of the Bluetooth device that establishes a Bluetooth connection with the display apparatus before the display apparatus enters into standby mode. The display apparatus may determine the Bluetooth device of which the device information is completely stored in the configuration file as the target Bluetooth device, and generate a connection command for establishing a Bluetooth connection with the target Bluetooth device based on the device information of the target Bluetooth device. For example, the configuration file may be a file with a suffix of .conf, such as bt_config.conf.

In some embodiments of the disclosure, after obtaining the connection command for establishing a Bluetooth connection with the target Bluetooth device, the processor may obtain the screen attribute identifier in response to the connection command, and determine the screen state of the display apparatus according to the obtained screen attribute identifier.

For example, if the screen attribute identifier is the first identifier, the processor may determine that the screen is turned on. If the screen attribute identifier is the second identifier, the processor may determine that the screen is turned off.

Step 312: establish a Bluetooth connection with the target Bluetooth device in response to the screen being turned on.

If it is determined the screen is turned on, the processor can determine that the display apparatus is in the power-on state, and thus can establish a Bluetooth connection with the target Bluetooth device via the Bluetooth module.

In some embodiments, in a case where the connection command is a request sent from the target Bluetooth device to the display apparatus, the Bluetooth module in the display apparatus may report the connection command to the Bluetooth protocol stack in response to receiving the connection command sent from the target Bluetooth device, and the Bluetooth protocol stack can establish a connection with the target Bluetooth device by calling a first connection interface, here the name of the first connection interface may be sink_connect_src.

In a case where the connection command is generated by the display apparatus through the Bluetooth module, the display apparatus may forward the connection command to the Bluetooth protocol stack through the upper layer A2DP profile after generating the connection command, so that the Bluetooth protocol stack calls a second connection interface to establish a Bluetooth connection with the target Bluetooth device, here the name of the second connection interface may be src_connect_sink.

In some embodiments, in a case where the target Bluetooth device has a speaker function, the target Bluetooth device may also output a voice prompt message "connection succeeds" in response to the display apparatus establishing a Bluetooth connection with the target Bluetooth device. Since the display apparatus establishes a Bluetooth connection with the Bluetooth device only in the case where the screen of the display apparatus is in on state, the Bluetooth connection method can avoid the case where the Bluetooth device continuously plays voice prompt messages while the display apparatus is in the standby mode, and thereby user experience is improved.

Step 313: prevent Bluetooth connection with the target Bluetooth device in response to the screen being off.

If the screen is turned off, the processor can determine that the display apparatus is in standby mode, and thus will prevent Bluetooth connection with the target Bluetooth device.

Figure 5:
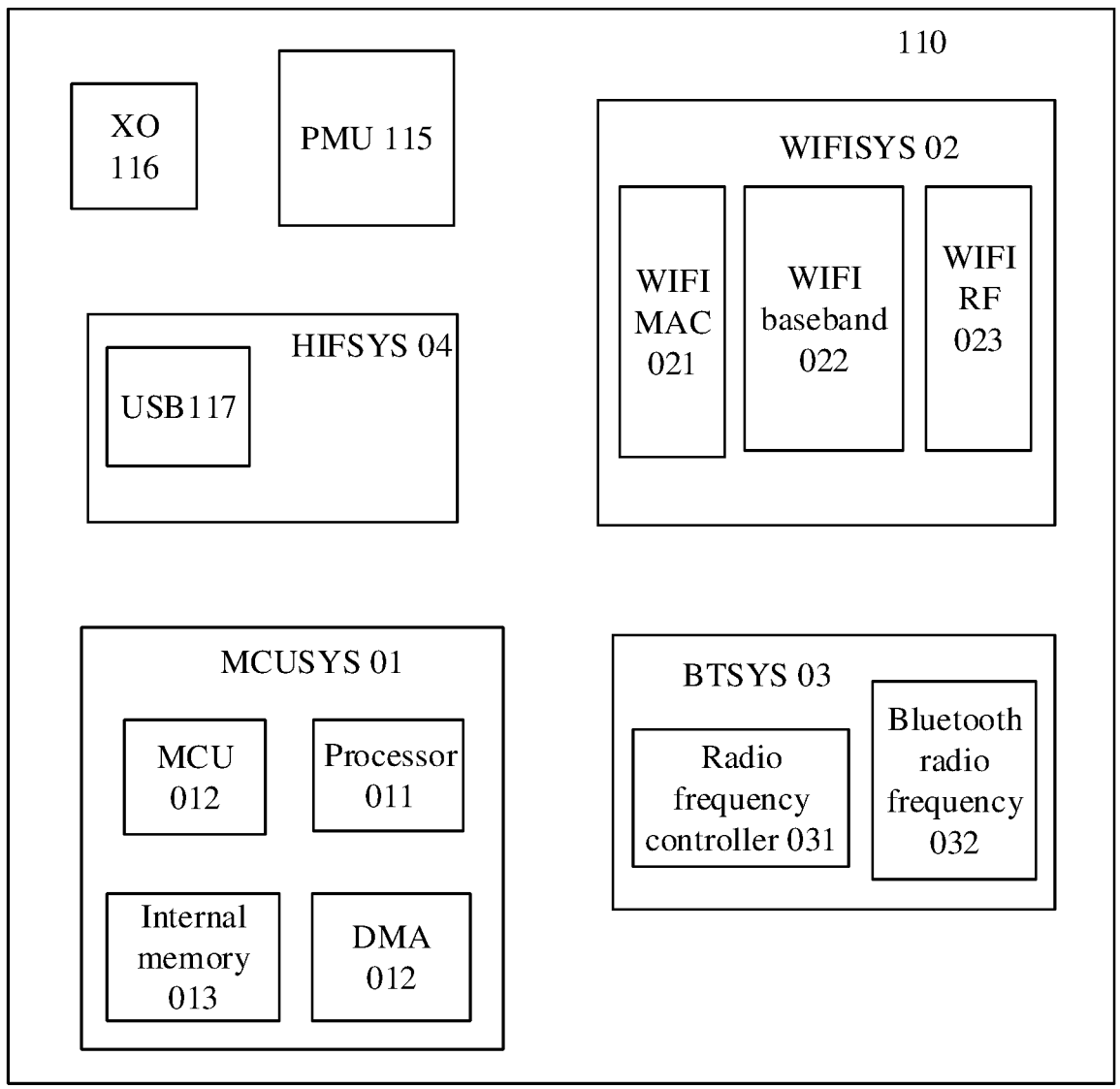
FIG. 5 illustrates a schematic diagram of the partial structure of another display apparatus according to some embodiments of the disclosure.

In some embodiments of the disclosure, referring to FIGS. 4 and 5, the display apparatus 110 may further include a main control chip 113, a backlight module 114, a Power Management Unit (PMU) 115, and a crystal oscillator (external oscillator, XO) 116. The main control chip 113 is respectively connected to the Bluetooth module 111, the WIFI module 112 and the backlight module 114, here the main control chip 113 may be connected to the Bluetooth module 111 and the WIFI module 112 through a Universal Serial Bus (USB) interface 117.

Referring to FIG. 5, the main control chip 113 may include an embedded Microcontroller Unit System (MCU-SYS) 01, the WIFI module 112 may include a WIFI system (SYS) 02, the Bluetooth module 111 may include a Blue Tooth System (BTSYS) 03, and the USB interface 117 may include a High Fidelity System (HIFSYS) 04. The MCU-SYS 01 may include a processor 011, an embedded Microcontroller Unit (MCU) 012, an internal memory 013, and a Direct Memory Access (DMA) 014. The processor 011 may be ARM cortex R4, which can be used for CPU load control and DMA management, etc. The MCU 012 may be a 32-bit Reduced Instruction Set Computer (RISC) MCU. This 32-bit RISC MCU may be used for clock control, power management and interface configuration, etc. The ARM cortex R4 and the 32 bit RISC MCU have their own memories, and may also use a same memory. The WIFISYS 02 may include a WIFI MAC 021, a WIFI baseband 022 and a WIFI Radio Frequency (RF) 023. The WIFI MAC 021 is used to indicate the MAC address of the display apparatus, the WIFI baseband 022 is used to receive and transmit electromagnetic waves, and the WIFI RF 023 is used to receive and send the radio frequency data. The BTSYS 03 may include a radio frequency controller 031 and a Bluetooth radio frequency 032. The radio frequency controller 031 may be used to adjust the radio frequency power, and the Bluetooth radio frequency 032 may be used to receive and send the radio frequency data.

It should be noted that the sequence of the steps of the Bluetooth connection method in some embodiments of the disclosure can be adjusted appropriately, and the steps can also be omitted if necessary. For example, one or more steps among the steps 301 to 310 can be omitted depending on actual situations. Variations that any person familiar with the technical field can easily think of within the technical scope disclosed in the present disclosure shall fall within the protection scope of the present disclosure.

In summary, some embodiments of the disclosure provide a Bluetooth connection method including determining screen state of a display apparatus in response to a connection command for establishing a Bluetooth connection with a target Bluetooth device, establishing a connection with the target Bluetooth device if it is determined that the screen is turned on, and preventing a connection with the target Bluetooth device if it is determined that the screen is turned off. Since the display apparatus establishes the connection with the Bluetooth device only when it is determined that the screen is turned on, a connection in a case that the screen is turned off is avoided, and also first connecting and soon disconnecting with the Bluetooth device in the case that the verification of the sending device fails can be avoided, thereby reducing the power consumption of the display apparatus compared with the related art.

Figure 6:
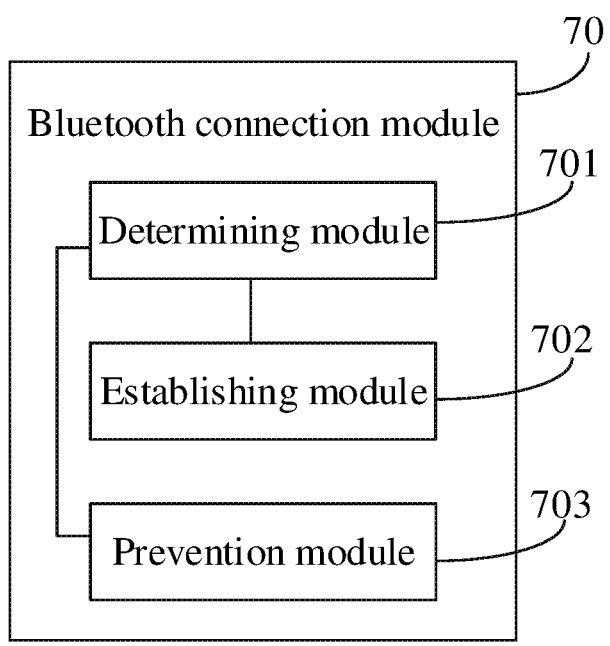
FIG. 6 illustrates a block diagram of a Bluetooth connection device according to some embodiments of the disclosure.

FIG. 6 is a block diagram of a Bluetooth connection device 70 according to some embodiments of the disclosure. The Bluetooth connection device may be the display apparatus shown in FIG. 1, or may be set in the display apparatus. As shown in FIG. 6, the device may include: a determining module 701, an establishing module 702, and a prevention module 703.

The determining module 701 is configured to: determine screen state of the display apparatus in response to a connection command for establishing a Bluetooth connection with a target Bluetooth device, where the screen state includes that the screen is on and the screen is off.

The establishment module 702 is configured to: in response to the screen being on, establish a Bluetooth connection with the target Bluetooth device.

The prevention module 703 is configured to: in response to the screen of the display apparatus being off, prevent a Bluetooth connection with the target Bluetooth device.

In summary, some embodiments of the disclosure provide a Bluetooth connection device. The determining module in the Bluetooth connection device can determine screen state of a display apparatus in response to a connection command for establishing a Bluetooth connection with a target Bluetooth device, the establishment module establishes a connection with the target Bluetooth device in response to the screen being on, and the prevention module prevents a connection with the target Bluetooth device while the screen is off. Since the display apparatus establishes the connection with the Bluetooth device only when the screen is on, a connection in a case that the screen is turned off is avoided, and also first connecting and soon disconnecting with the Bluetooth device in the case that the verification of the sending device fails will be avoided, thereby reducing the power consumption of the display apparatus compared with the related art.

Figure 7:
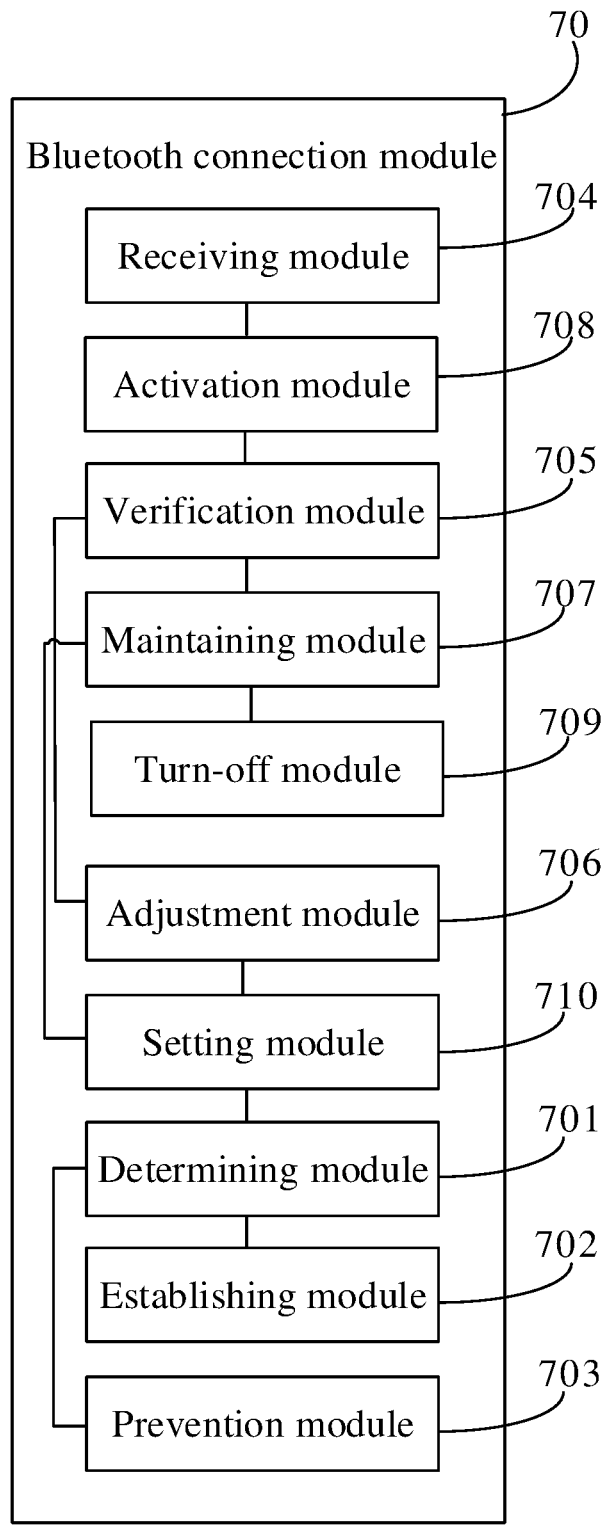
FIG. 7 illustrates a block diagram of another Bluetooth connection device according to some embodiments of the disclosure.
Figure 8:
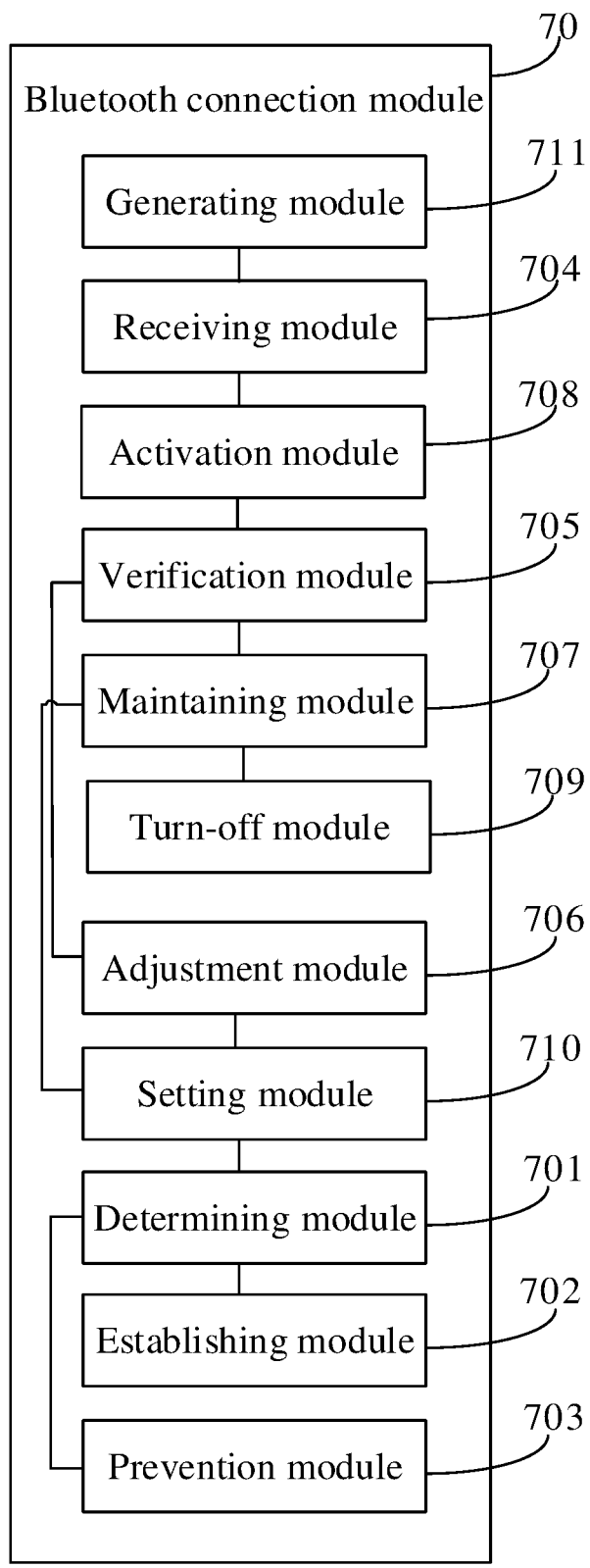
FIG. 8 illustrates a block diagram of yet another Bluetooth connection device according to some embodiments of the disclosure.

In some embodiments, the display apparatus may include a Bluetooth module and a WiFi module that shares the same power supply circuit; and referring to FIG. 7 or FIG. 8, the device may further include:

a receiving module 704 configured to receive a command for turning on the screen via the WiFi module while the screen is in off state, before determining the screen state of the display apparatus in response to a connection command for establishing a Bluetooth connection with a target Bluetooth device, wherein the command for turning on the screen carries device information of the sending device;

a verification module 705 configured to verify the device information;

an adjustment module 706 configured to adjust the screen state by turning on the screen if the verification of the device information is successful;

a maintaining module 707 configured to maintain the screen off if the verification of the device information is not successful.

The receiving module 704 is further configured to receive a wake-up command via the WiFi module, before receiving the command for turning on the screen via the WiFi module.

The device may further include:

a start module 708 configured to start the Bluetooth module in response to the wake-up command.

The start module 708 is further configured to start the Bluetooth module in inactivated state in response to receiving the command for turning on the screen via the WiFi module.

The device may further include:

a turn-off module 709 configured to turn off the Bluetooth module if the verification of the device information is not successful.

In some embodiments, referring to FIG. 7 or FIG. 8, the device may further include:

a setting module 710 configured to set a screen attribute identifier of the display apparatus based on the verification result of the device information.

The determining module 701 is configured to determine the screen state of the display apparatus based on the screen attribute identifier.

In some embodiments, the setting module 710 is configured to:

set the screen attribute identifier of the display apparatus as a first identifier if the verification of the device information is successful; and set the screen attribute identifier of the display apparatus as a second identifier if the verification of the device information is not successful.

The determining module 701 is configured to:

determine that the screen is turned on in response to the screen attribute identifier being the first identifier; and determine that the screen is turned off in response to the screen attribute identifier being the second identifier.

In some embodiments, the verification module 705 is further configured to detect whether the remote wake-up function is enabled in response to a standby command.

The maintaining module 707 is further configured to maintain the WiFi module in the activated state in response to the remote wake-up function being enabled.

In some embodiments, referring to FIG. 7, the receiving module 704 is further configured to receive a connection command sent from the target Bluetooth device before determining the screen state of the display apparatus.

Alternatively, referring to FIG. 8, the device may further include: a generating module 711 configured to determine a target Bluetooth device with which a Bluetooth connection has been established via the Bluetooth module prior to the standby mode before determining the screen state of the display apparatus, and generate a connection command for establishing a Bluetooth connection with the target Bluetooth device.

In summary, some embodiments of the disclosure provide a Bluetooth connection device. The determining module in the Bluetooth connection device determines the screen state of a display apparatus in response to a connection command for establishing a Bluetooth connection with a target Bluetooth device, the establishment module establishes a connection with the target Bluetooth device in response to the screen being on, and the prevention module prevents the connection with the target Bluetooth device in response to the screen being off. Since the display apparatus establishes the connection with the Bluetooth device only when it is determined that the screen is turned on, a connection in a case that the screen is turned off is avoided, and also first connecting and soon disconnecting with the Bluetooth device when the verification of the sending device fails can be avoided, thereby reducing the power consumption of the display apparatus compared with the related art.

Some embodiments of the disclosure provide a display apparatus, which can be applied in the implementation environment shown in FIG. 1. The display apparatus may include: a WiFi module, a Bluetooth module and a processor, wherein the WiFi module and the Bluetooth module share the same power supply circuit. The processor is configured to: determine screen state of the display apparatus in response to a connection command for establishing a Bluetooth connection with a target Bluetooth device, wherein the screen state includes that the screen is on and that the screen is off; in response to the screen being on, establish a Bluetooth connection with the target Bluetooth device via the Bluetooth module; and in response to the screen being off, prevent Bluetooth connection with the target Bluetooth device.

Some embodiments of the disclosure provide a television, which can be applied in the implementation environment shown in FIG. 1. The television may include: a WiFi module, a Bluetooth module and a processor, wherein the WiFi module and the Bluetooth module share a power supply circuit. The processor is configured to: determine a screen state of the display apparatus in response to a connection command for establishing a Bluetooth connection with a target Bluetooth device, wherein the screen state includes that the screen is on and that the screen is off; in response to the screen being on, establish a Bluetooth connection with the target Bluetooth device via the Bluetooth module; and in response to the screen being off, prevent the Bluetooth connection with the target Bluetooth device.

Some embodiments of the disclosure provide a television, including: a WiFi module; a Bluetooth module; a power supply circuit, where the WiFi module and the Bluetooth module share the same power supply circuit; and a processor configured to: receive a wake-up command for causing the Bluetooth module powered-on; receive a connection command for establishing a Bluetooth connection with a target Bluetooth device; establish a Bluetooth connection with the target Bluetooth device via the Bluetooth module in response to the screen being on; and prevent the Bluetooth connection with the target Bluetooth device in response to the screen being off.

In some embodiments, in response to the wake-up command, the processor is further configured to: enable the Bluetooth module that has not been enabled.

In some embodiments, the processor is further configured to: verify a mobile terminal that sends the command for turning on the screen in response to the command for turning on the screen received after the wake-up command while the Bluetooth module is in activated state; control to light the screen in response to the verification being successful; and control to maintain the screen off in response to the verification being not successful.

In some embodiments, the wake-up command is a command automatically sent to the television while the mobile terminal is in the same local area network as the television.

In some embodiments, the wake-up command is not used to change the screen state.

Some embodiments of the disclosure provide a television, including: a screen; a WiFi module; a Bluetooth module; a power supply circuit, here the WiFi module and the Bluetooth module share the same power supply circuit; a processor configured to: receive a wake-up command for causing an operating system of the television into running state, the Bluetooth module into activated state and the screen to maintain off; receive a connection command for establishing a Bluetooth connection with a target Bluetooth device, and receive a command for turning on the screen sent from a mobile terminal, wherein the command for turning on the screen is used to turn on the screen; verify the mobile terminal that sends the command for turning on the screen; establish a Bluetooth connection with the target Bluetooth device via the Bluetooth module in response to the verification being successful; and prevent the Bluetooth connection with the target Bluetooth device in response to the verification being not successful.

Some embodiments of the disclosure provide a non-transitory computer readable storage medium that stores instructions therein, and the non-transitory computer readable storage medium causes a computer to perform the Bluetooth connection method as shown in FIG. 2 or 3 when running on the computer.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A display apparatus, comprising:
a display;
a WiFi module;
a Bluetooth module;
a power supply circuit, wherein the WiFi module and the Bluetooth module share the power supply circuit;
a processor, in communication with the display, the WiFi module, the Bluetooth module and the power supply circuit and configured to:
   receive a wake-up command for causing the Bluetooth module into an activated state from a mobile terminal;
   receive a connection command for establishing a Bluetooth connection with a target Bluetooth device, wherein the target Bluetooth device is different from the mobile terminal;
   establish the Bluetooth connection with the target Bluetooth device via the Bluetooth module while a screen state of the display is on; and
   prevent the Bluetooth connection with the target Bluetooth device while the screen state of the display is off;
and
a Power Management (PM) module, configured to:
   detect whether there is a change of an electric level of a general purpose input/output (GPIO) port of the WiFi module; and
   start the Bluetooth module in response to the change being detected.

2. The display apparatus according to claim 1, wherein the processor is further configured to:
detect whether the Bluetooth module is enabled in response to receiving the wake-up command; and
in response to the Bluetooth module being not enabled, enable the Bluetooth module.

3. The display apparatus according to claim 2, wherein the processor is further configured to:
in response to a command for turning on the display sent from the mobile terminal while the Bluetooth module is enabled, verify the mobile terminal that sends the command for turning on the display;
in response to the verification being successful, adjust the screen state by turning on the display; and
in response to the verification being not successful, keep the screen state off.

4. The display apparatus according to claim 1, wherein the wake-up command is sent automatically from the mobile terminal when the mobile terminal and the display apparatus are in same local area network.

5. The display apparatus according to claim 1, wherein the wake-up command is configured not to change the screen state of the display.

6. The display apparatus according to claim 5, wherein the wake-up command is further configured for maintaining the display off.

7. The display apparatus according to claim 1, wherein the wake-up command is further configured to cause an operating system of the display apparatus into a running state.

8. The display apparatus according to claim 1, wherein the target Bluetooth device is one or more of a speaker, a personal computer, a laptop, a tablet computer, or a mobile phone.

9. The display apparatus according to claim 1, wherein the processor is further configured to:
   adjust an electric level of a general purpose input/output (GPIO) port of the WiFi module, in response to the wake-up command.

10. A method for a display apparatus, comprising:
   receiving a wake-up command for causing a Bluetooth module of the display apparatus into an activated stated from a mobile terminal, wherein the display apparatus comprises a WiFi module, the Bluetooth module, a power supply circuit shared by the WiFi module and the Bluetooth module, and a Power Management (PM) module;
   receiving a connection command for establishing a Bluetooth connection with a target Bluetooth device, wherein the target Bluetooth device is different from the mobile terminal;
   establishing the Bluetooth connection with the target Bluetooth device via the Bluetooth module while a screen state of the display is on; and
   preventing the Bluetooth connection with the target Bluetooth device while the screen state of the display is off:
   wherein the method further comprises:
   detecting whether there is a change of an electric level of a general purpose input/output (GPIO) port of the WiFi module; and
   starting the Bluetooth module in response to the change being detected.

11. The method according to claim 10, further comprising:
   detecting whether the Bluetooth module is enabled in response to receiving the wake-up command; and
   in response to the Bluetooth module being not enabled, enabling the Bluetooth module.

12. The method according to claim 11, further comprising:
   in response to a command for turning on the display sent from the mobile terminal while the Bluetooth module is enabled, verifying the mobile terminal that sends the command for turning on the display;
   in response to the verification being successful, adjusting the screen state by turning on the display; and
   in response to the verification being not successful, keeping the screen state off.

13. The method according to claim 10, wherein the wake-up command is sent automatically from the mobile terminal when the mobile terminal and the display apparatus are in same local area network.

14. The method according to claim 10, wherein the wake-up command is configured to not change the screen state of the display.

15. The method according to claim 14, wherein the wake-up command is further configured to maintain the display off.

16. The method according to claim 10, wherein the wake-up command is further configured to cause an operating system of the display apparatus into a running state.

17. The method according to claim 10, wherein the target Bluetooth device is one or more of a speaker, a personal computer, a laptop, a tablet computer, or a mobile phone.

18. The method according to claim 10, further comprising:
   adjusting an electric level of a general purpose input/output (GPIO) port of the WiFi module, in response to the wake-up command.

* * * * *